(12) United States Patent
Peng et al.

(10) Patent No.: US 7,374,419 B2
(45) Date of Patent: May 20, 2008

(54) GATING STRUCTURE FOR MOLD

(75) Inventors: Jeng-Chi Peng, Tu-Cheng (TW);
Heng-Wei Li, Fremont, CA (US)

(73) Assignee: Hon Hai Precision Industry Co., Ltd., Tu-Chung, Taipei Hsien (TW)

( * ) Notice: Subject to any disclaimer, the term of this patent is extended or adjusted under 35 U.S.C. 154(b) by 0 days.

(21) Appl. No.: 11/398,016

(22) Filed: Apr. 4, 2006

(65) Prior Publication Data

US 2006/0292260 A1    Dec. 28, 2006

(30) Foreign Application Priority Data

Jun. 24, 2005   (CN) .................. 2005 1 0035549

(51) Int. Cl.
*B29C 45/40* (2006.01)
*B29C 45/38* (2006.01)

(52) U.S. Cl. .................. 425/556; 425/444; 425/562; 425/567

(58) Field of Classification Search .......... 425/556, 425/444, 562, 567; 264/334, 335, 336
See application file for complete search history.

(56) References Cited

U.S. PATENT DOCUMENTS 5,512,223 A * 4/1996 Morikita .................. 264/71
5,804,117 A     9/1998 Baba et al.

FOREIGN PATENT DOCUMENTS

JP      57051434 A      3/1982
JP      64-30724      *   2/1989

* cited by examiner

*Primary Examiner*—James P. Mackey
*Assistant Examiner*—Seyed Masoud Malekzadeh
(74) *Attorney, Agent, or Firm*—Jeffrey T. Knapp

(57) ABSTRACT

A gating structure (13) for molding connects with a mold cavity (300). The gating structure includes a first gate (100), a second gate (200), an ejector sleeve (400) and an ejector pin (500). The second gate connects with the first gate at an angle. The ejector pin extends through the ejector sleeve. One part of the ejector pin fixes in the ejector sleeve, the other par of the ejector pin is received in the second gate.

16 Claims, 3 Drawing Sheets

GATING STRUCTURE FOR MOLD

BACKGROUND OF THE INVENTION

1. Field of the Invention

The present invention relates to gating structure for molds and, particularly, to a gating structure for controlling injection mold of plastic parts.

2. Discussion of the Related Art

Some products made of a polymer or other plastic are typically created by injection molding. During a typical injection molding process, a molten material is injected into a mold cavity via a runner. The molten material filled in the cavity is cooled and is set or solidified to form the molded product. However, if the molten material is directly injected into the mold cavity, the molten material will be effected by a resistance from the mold cavity such that defects such as flow marks will appear in the final product. It is necessary to adopt different gating designs for different molded product structures so as to eliminate defects. The gating structure is generally a structure that connects the runner and the mold cavity. After injection molding, scraps or swarf are formed at the gating structure. These scraps are usually referred to as 'gate'. In conventional technology, gates of many different types such as edge gate, tab gate, fan gate, submarine gate, and pin gate are used. Different gates are suitable in different places and using an improper gating structure will cause high injection pressure, long cycle time and non-uniform shrinkage.

One kind of typical gating structure for molding is represented in FIG. 4. The gating structure for molding includes a submarine gate 10 and a cylindrical gate 20. One end of the cylindrical gate 20 connects with a mold cavity 30, the other end of the cylindrical gate 20 connects with an ejector pin 40. In order to avoid forming defects through non-uniform shrinkage, the diameter of the cylindrical gate 20 is the same as a width of the mold cavity 30. Accordingly, the diameter of the cylindrical gate 20 is limited. Furthermore, the molten material flow is slowed so that the finished result is effected. Especially for thin molded products, the effect will be more obvious.

Therefore, an improved gating structure is desired in order to overcome the above-described problems.

SUMMARY OF THE INVENTION

One embodiment of the present gating structure for molding connects with a mold cavity The gating structure for molding includes a first gate, a second gate, an ejector sleeve and a rod. The second gate connects with the first gate at an angle. The ejector sleeve is received in the second gate. The rod extends through the ejector sleeve. One part of the rod fixes in the ejector sleeve, the other part of the rod extends in the second gate.

Another embodiment of the present mold apparatus includes an upper mold and a lower mold. The upper mold disposes a gating structure. The gating structure includes a first gate, a second gate, an ejector sleeve and a rod. The second gate connects with the first gate at an angle. The ejector sleeve is fixed in the second gate. The rod has one end fixed with the ejector sleeve, and an opposite end extends in the second gate. The lower mold cooperates with the upper mold to define a cavity therebetween. The second gate communicates with the cavity.

A further embodiment of the present gating structure for molding connects with a cavity. The gating structure includes a first gate and a second gate. The second gate connects with the first gate at an angle and communicates with the cavity. The second gate disposes a non-filling zone. The non-filing zone is spaced from the second gate so as to form a passage. A width of the passage substantially equals a depth of the mold cavity.

Other advantages and novel features of the present gating structure will become more apparent from the following detailed description when taken in conjunction with the accompanying drawings.

BRIEF DESCRIPTION OF THE DRAWINGS

Many aspects of the gating structure for molding can be better understood with reference to the following drawings. The components in the drawings are not necessarily drawn to scale, the emphasis instead being placed upon clearly illustrating the principles of the present gating structure for molding. Moreover, in the drawings, like reference numerals designate corresponding parts throughout the several views.

DETAILED DESCRIPTION OF THE EMBODIMENTS

Figure 1:
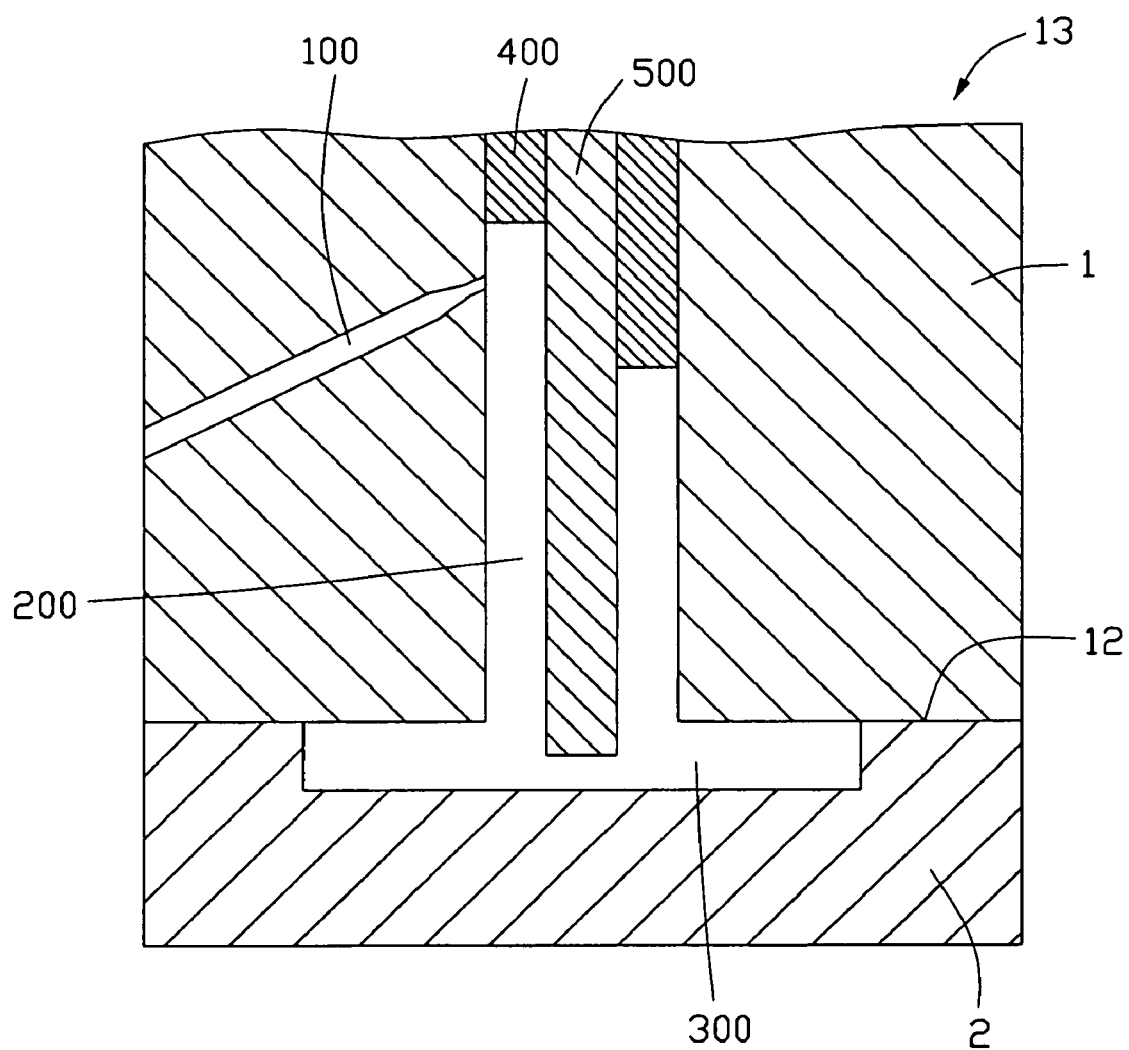
FIG. 1 is a cross-sectional view of an embodiment of the gating structure for molding.

Referring now to the drawings in detail, FIG. 1 shows a gating structure 13 for molding in accordance with one embodiment. The gating structure 13 may be applied to an injection mold apparatus 11.

The mold apparatus 11 includes an upper mold 1 and a lower mold 2. The upper mold 1 and the lower mold 2 may be movable relative to each other. A parting line 12 is formed between the upper mold 1 and the lower mold 2. The upper mold 1 and the lower mold 2 cooperatively form a mold cavity 300 therebetween. The upper mold 1 disposes the gating structure 13. The gating structure 13 includes a first gate 100, a second gate 200, an ejector sleeve 400 and a rod 500.

The first gate 100 may be a submarine gate, and the second gate 200 may be a cylindrical gate. The submarine gate 100 connects with the cylindrical gate 200 at an angle. After injection molding, the molten material in the submarine gate 100 forms a scrap. The scrap may be automatically cut off by shearing when the mold apparatus 11 is separated. The cylindrical gate 200 is substantially a cylinder in shape. One end of the cylindrical gate 200 communicates with the mold cavity 300, the other end of the cylindrical gate 200 connects with the ejector sleeve 400.

Figure 2:
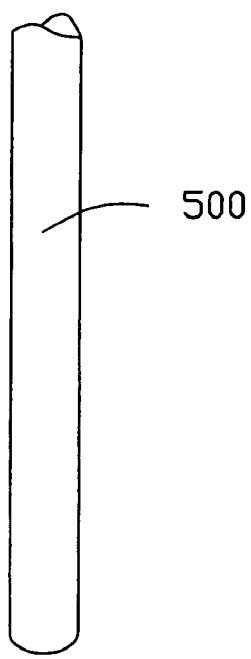
FIG. 2 is a view of the ejector pin shown in FIG. 1.
Figure 3:
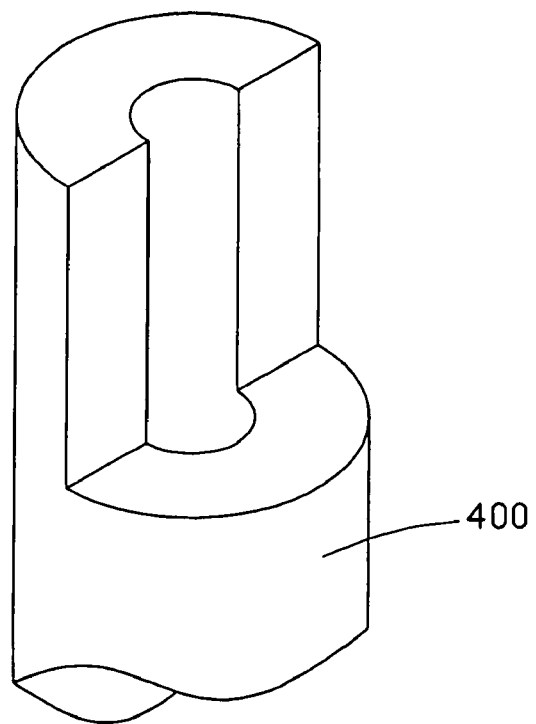
FIG. 3 is an enlarged view of the ejector sleeve shown in FIG. 1.
Figure 4:
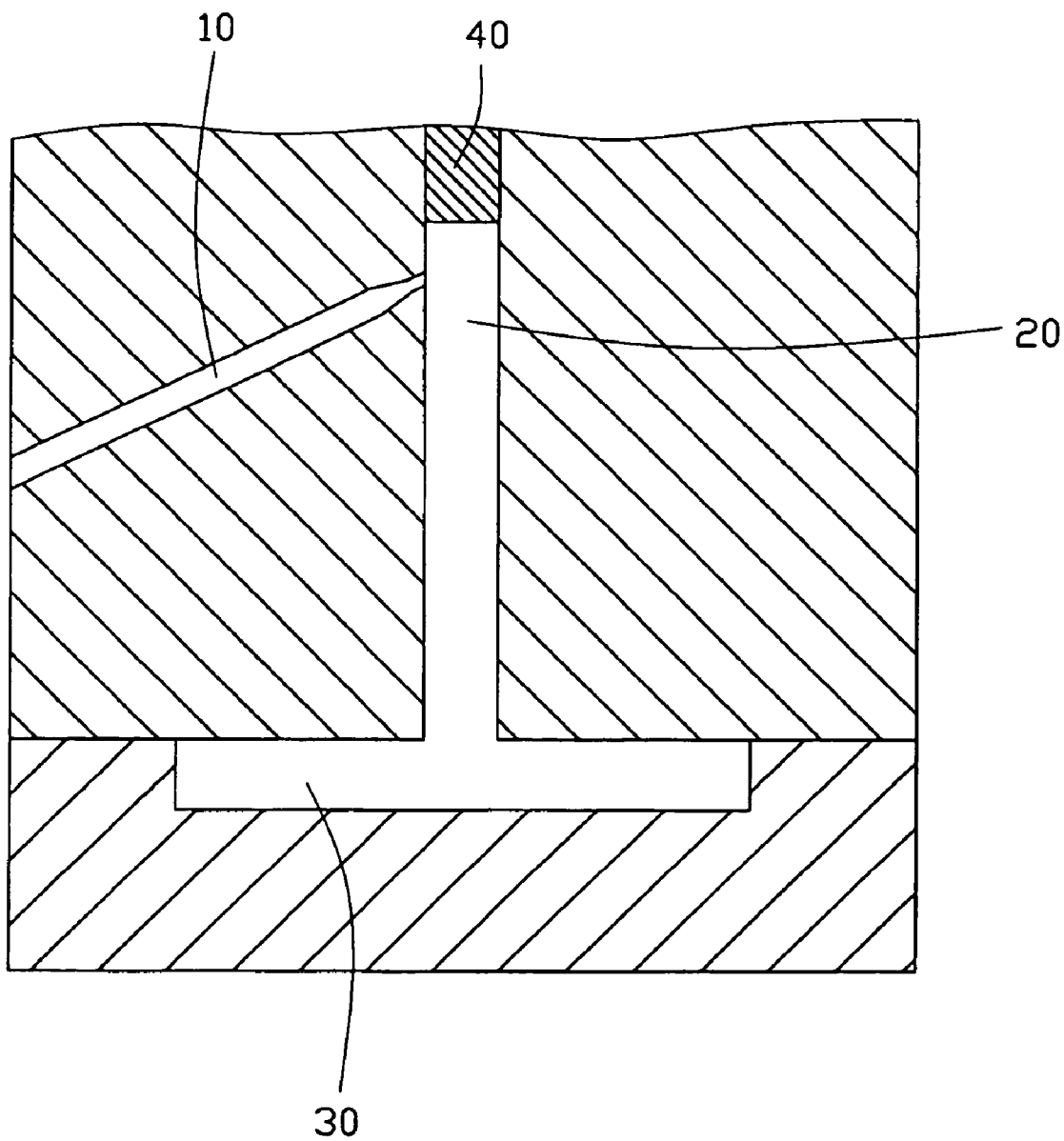
FIG. 4 is a cross-sectional view of a conventional gating structure for molding.

Referring also to FIGS. 2 and 3, the ejector sleeve 400 is fixed with the upper mold 1. A height of a sidewall of the ejector sleeve 400 adjacent the submarine gate 100 is less than that of an opposite sidewall thereof This structure may decrease impact on the rod 500 when the molten material is injected into the cylindrical gate 200 from the submarine gate 100. The rod 500 is substantially cylindrical in shape and may be an ejector pin 500 of the mold apparatus. The ejector pin 500 passes through the ejector sleeve 400, with one part of the ejector pin 500 fixing and being accommodated in the ejector sleeve 400 and the other part of the ejector pin 500 extending in the cylindrical gate 200 toward the mold cavity 300, thus forming a non-filling zone (i.e., a zone that the ejector pin 500 occupies) in the cylindrical gate 200. A distance between an outside periphery wall of the ejector pin 500 and an inner periphery wall of the cylindrical gate 200 is approximately equal to a depth of the mold cavity 300. This avoids non-uniform shrinkage of the product whilst at the same time, the flow of the molten material is increased. A distal end of the ejector pin 500 and thus the non-filling zone may extend into the mold cavity 300 so as to avoid sink marks.

During the process of the injection molding, the molten material is injected into the cylindrical gate 200 from the submarine gate 100. A diameter of the connection between the submarine gate 100 and the cylindrical gate 200 is very small, and this can produce spurting. The cylindrical gate 200 will mitigate the spurting so as to improve the appearance of the molded product. The ejector pin 500 is disposed in the cylindrical gate 200 so that the molded product may have uniform shrinkage with basically the same thickness. Furthermore, the ejector sleeve 400 may prevent the ejector pin 500 from bending when a high pressure is produced owing to injection. The thickness for the connection between the cylindrical gate 200 and the mold cavity 300 is non-uniform so as to produce sink marks. Decreasing the distance between the ejector pin 500 and the bottom of the mold cavity 300 may overcome the appearance of the flow marks and sink marks.

In alternative embodiments, the ejector pin 500 may be replaced by a cylinder body in the cylindrical gate 200. The cylinder body has one end fixed in the cylinder gate 200, and the other opposite end extending into the mold cavity, thereby forming a non-filling zone. The non-filling zone is spaced from the second gate so as to form a passage. The passage may make the molten plastics run to the mold cavity. This avoids non-uniform shrinkage of the molded product.

As described above, the present invention by way of examples provides a gating structure for use with any molding, beyond the injection mold illustrated, and/or with other structure needing a gating structure.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A gating structure for a mold apparatus, the gating structure connecting with a mold cavity, and comprising:
   a first gate;
   a second gate connecting with the first gate at an angle, the second gate communicating with the mold cavity;
   an ejector sleeve received in the second gate, wherein a sidewall of the ejector sleeve adjacent to the first gate is shorter than an opposite sidewall of the ejector sleeve; and
   a rod extending through the ejector sleeve, one part of the rod accommodated in the ejector sleeve, the other part of the rod extending in the second gate toward the mold cavity.

2. The gating structure as claimed in claim 1, wherein the first gate is a submarine gate, and the second gate is a cylindrical gate.

3. The gating structure as claimed in claim 1, wherein the rod extends into the mold cavity.

4. The gating structure as claimed in claim 1, wherein a distance between an outer periphery wail of the rod and an inner periphery wall of the second gate is approximately equal to a depth of the mold cavity.

5. The gating structure as claimed in claim 1, wherein the rod is an ejector pin.

6. A mold apparatus comprising:
   an upper mold disposing a gating structure, the gating structure including:
   a first gate;
   a second gate connecting with the first gate at an angle;
   an ejector sleeve fixed in the second gate; and
   a rod having one end fixed with the ejector sleeve, and an opposite end extending in the second gate; and
   a lower mold cooperating with the upper mold to define a mold cavity therebetween, the second gate communicating with the mold cavity.

7. The mold apparatus as claimed in claim 6, wherein the first gate is a submarine gate, and the second gate is a cylindrical gate.

8. The mold apparatus as claimed in claim 6, wherein a sidewall of the ejector sleeve adjacent to the first gate is shorter than an opposite sidewall of the ejector sleeve.

9. The mold apparatus as claimed in claim 6, wherein the rod extends into the mold cavity.

10. The mold apparatus as claimed in claim 6, wherein the distance between an outer periphery wall of the rod and an inner periphery wall of the second gate substantially equals a depth of the mold cavity.

11. The mold apparatus as claimed in claim 6, wherein the rod is an ejector pin.

12. A gating structure for a mold apparatus, the gating structure connecting with a mold cavity of the mold apparatus, and comprising:
   a first gate; and
   a second gate connecting with the first gate at an angle and communicating with the cavity, a non-filling zone formed in a middle area of the second gate and spaced from sidewalls of the second gate so as to form a passage, a width of the passage substantially equaling a depth of the mold cavity, wherein the non-filling zone is formed by a rod having one end fixed in the second gate and an opposite end extending into the mold cavity.

13. The gating structure as claimed in claim 12, wherein the first gate is a submarine gate, and the second gate is a cylindrical gate.

14. The gating structure as claimed in claim 12, wherein the non-filing zone extends into the mold cavity.

15. The gating structure as claimed in claim 12, wherein an ejector sleeve is fixed in the second gate, and said one end of the rod is fixed in the ejector sleeve.

16. The gating structure as claimed in claim 15, wherein the rod is an ejector pin.

* * * * *